(12) United States Patent
Sandstrom

(10) Patent No.: US 7,254,138 B2
(45) Date of Patent: Aug. 7, 2007

(54) TRANSPARENT, LOOK-UP-FREE PACKET FORWARDING METHOD FOR OPTIMIZING GLOBAL NETWORK THROUGHPUT BASED ON REAL-TIME ROUTE STATUS

(75) Inventor: Mark Henrik Sandstrom, San Francisco, CA (US)

(73) Assignee: Optimum Communications Services, Inc. (CA)

( * ) Notice: Subject to any disclaimer, the term of this patent is extended or adjusted under 35 U.S.C. 154(b) by 1180 days.

(21) Appl. No.: 10/192,118

(22) Filed: Jul. 11, 2002

(65) Prior Publication Data

US 2004/0032856 A1   Feb. 19, 2004

Related U.S. Application Data

(60) Provisional application No. 60/356,503, filed on Feb. 11, 2002.

(51) Int. Cl.
*H04L 12/28* (2006.01)
(52) U.S. Cl. .................. 370/412; 370/252; 370/400; 370/392; 718/105
(58) Field of Classification Search .............. None
See application file for complete search history.

(56) References Cited

U.S. PATENT DOCUMENTS

| | | | |
|---|---|---|---|
| 6,069,889 A * | 5/2000 | Feldman et al. | 370/351 |
| 6,337,862 B1 * | 1/2002 | O'Callaghan et al. | 370/392 |
| 6,397,260 B1 * | 5/2002 | Wils et al. | 709/238 |
| 7,027,448 B2 * | 4/2006 | Feldmann et al. | 370/401 |
| 2002/0024974 A1 * | 2/2002 | Karagiannis et al. | 370/516 |
| 2002/0031107 A1 * | 3/2002 | Li et al. | 370/338 |
| 2002/0080755 A1 * | 6/2002 | Tasman et al. | 370/338 |
| 2002/0103631 A1 * | 8/2002 | Feldmann et al. | 703/22 |
| 2003/0012141 A1 * | 1/2003 | Gerrevink | 370/250 |

\* cited by examiner

*Primary Examiner*—Duc Ho
(74) *Attorney, Agent, or Firm*—Fenwick & West LLP

(57) ABSTRACT

A packet forwarding method for optimizing packet traffic flow across communications networks and simplifying network management. The invention provides look-up-free and packet-layer-protocol transparent forwarding of multi-protocol packet traffic among Layer-N (N=2 or upper in the ISO OSI model) nodes. The invention enables flexible and efficient packet multicast and anycast capabilities along with real-time dynamic load balancing and fast packet-level traffic protection rerouting. Applications include fast and efficient packet traffic forwarding across administrative domains of Internet, such as an ISP's backbone or an enterprise virtual private network, as well as passing packet traffic over a neutral Internet exchange facility between different administrative domains.

37 Claims, 9 Drawing Sheets ial Field  # TRANSPARENT, LOOK-UP-FREE PACKET FORWARDING METHOD FOR OPTIMIZING GLOBAL NETWORK THROUGHPUT BASED ON REAL-TIME ROUTE STATUS

CROSS-REFERENCES TO RELATED APPLICATIONS

The subject matter of this application is related to and makes references to the following patent applications:

[1] Co-pending U.S. utility patent application Ser. No. 09/938,014, filing date Aug. 24, 2001, by Mark Henrik Sandstrom, entitled "A System and Method for Maximizing the Traffic Delivery Capacity of Packet Transport Networks via Real-time Traffic Pattern Based Optimization of Transport Capacity Allocation".

[2] U.S. Provisional patent application Ser. No. 60/356,503, filing date Feb. 11, 2002, by Mark Henrik Sandstrom, entitled "Real-time Control-Plane for Maximizing Billable-Traffic-Throughput of Packet Transport Networks".

This application further claims the benefit under 35 U.S.C. § 119(e) of U.S. Provisional Application No. 60/356,503, filed Feb. 11, 2002, which is herein incorporated in its entirety by reference.

BACKGROUND OF THE INVENTION

1. Technical Field

The present invention pertains to the field of communications networks, in particular to the field of packet forwarding schemes in digital communications networks.

2. Descriptions of the Related Art

List of acronyms:

| | |
|---|---|
| AD | Administrative Domain |
| FEV | Forwarding Enable Vector |
| FIT | Forwarding Instruction Tag |
| IFU | Interface Unit |
| L1 | ISO OSI Stack Layer 1 |
| L2 | ISO OSI Stack Layer 2 |
| L3 | ISO OSI Stack Layer 3 |
| LER | Label Edge Router |
| LSR | Label Switch Router |
| LSE | MPLS Label Stack Entry |
| MPLS | Multi-Protocol Label Switching, IETF RFC 3032 |
| ISP | Internet Service Provider |
| IP | Internet Protocol, IPv4: IETF RFC 791, IPv6: IETF FRC 2460 |
| PPP | Point-to-Point Protocol, IETF RFC 1661 |
| QoS | Quality of Service |
| TTL | Time To Live |

The purpose of packet-switching networks, such as the Internet, is to deliver data packets from the source node of a packet to a destination node of the packet, wherein the node means a host, a server, a switch or a router. To be delivered to its proper destination by a packet switching network, a packet needs to include a destination identifier. Out of the nodes addressed within and reachable by certain network domain, a packet may be destined to a particular single node, to a certain set of nodes, or one of a specified set of nodes. Thus the destination identifier of a packet should be considered as a forwarding instruction for the network domain to deliver the packet to a proper set of nodes reachable by the network domain. It further appears that such forwarding instructions of packet have significance only within the network domain interconnecting the set of nodes reachable by it, i.e. the forwarding instruction is said to be local to that network domain.

Typically, the finite number of external interfaces of network domain can be numbered, i.e. addressed with interface identification numbers, so that each interface of the network domain has a unique address i.e. identification number within that domain. As a basic example, assume a network interconnecting one hundred nodes, so that each of the one hundred nodes has a single and dedicated interface to the network. These node-specific interfaces can then be addressed with their related interfaces numbers, which could be e.g. the integers from 1 through 100 (inclusive). Thus, in the event that any of the one hundred nodes needs to send a packet to the node behind the network interface #75, the node specifies number 75 as the domain-scope destination identifier in the forwarding instruction included in the packet header. The network domain will then try to deliver that packet to the node associated with its interface #75. This type of a process of the network delivering a packet to a destination node based on a forwarding instruction is called routing the packet.

The above model of destination identifier-based packet routing (called also switching or forwarding) is generally quite efficient for unicasting, i.e. for delivering a data packet to a single destination specified by its destination identifier, and it is the basic model of the current packet-switched communications protocols, such as IP, FR, ATM or MPLS, all of which use an integer number to identify the network-domain-scope destination for each packet or cell. The unicast destination identifier based forwarding requires the packet-switching nodes to resolve the next-hop destination for each packet using route information databases such as routing, switching or forwarding tables, called collectively as switching-tables, which provide a mapping between the packet destination identifiers and their associated forwarding instructions, wherein a forwarding instruction includes an identification of the egress port (or equal) on which the switch should forward the packet. Naturally, such switching-tables need to be configured and maintained in order for the network to work properly, which process is known to be rather complex especially for networks with a large number of packet-switching nodes.

However, even with their increasing complexity, there are certain serious limitations with the current packet-switching techniques, particularly in the areas of multicasting, anycasting and traffic protection.

Conventionally a packet-switch, when receiving a packet (a 'packet' is used here to refer also a 'cell') on one of its ingress ports, looks up with the destination identifier of the packet from a network management software-configured switching-table the egress port and the egress link identifier configured for the packet. While this process requires configuring and maintaining a switching-table containing forwarding instructions per each destination identifier for each packet-switching node in the network, and even though the packet-switches thus become quite complex, this regular packet-switching method does not allow configuring more than a single egress port and a link identifier in the switching-tables per an ingress link without substantial additional complexity.

Thus, conventional packet-switching is not efficient when a portion of the packets would need to be forwarded to a group of more than one egress ports, or to any suitable egress port out of such defined multi- or anycast group. This in turn requires either multiplying the complexity of conventional packet-switching to support multicast and anycast, thereby limiting the scalability and reducing the cost-efficiency of the switching technology, or replicating a multicast packet multiple times to be send individually i.e. unicast it to each individual destination. For anycast type of traffic, e.g. in case that one out of a group of servers should be contacted, this unicast method typically can not dynamically select the least loaded i.e. currently best responding server, resulting in non-balanced server load patterns, and often poor client performance experience.

Traffic protection re-routing at the packet-level requires a packet to be forwarded at some point in the network between its source and destination nodes to a non-default 'detour' route to avoid an unexpected failure associated with the route it would normally use. With conventional packet switching, such protection re-routing protection involves software based reconfiguration of routing, switching and/or forwarding tables of the nodes in the network between the source and the destination of the packet, which causes non-deterministic and often intolerably long traffic protection restoration completion times, especially in the case of multiple route, switch and forwarding table entries that would need to be reconfigured simultaneously or over a short period of time. It appears that pre-computing a protection route and indicating both the regular and the protection route in the forwarding instructions of the packets, and using a packet-switch-interconnect network that delivers the packet along the appropriate route based on real-time route status, would be needed to provide deterministic, efficient and fast packet-level traffic protection. However, such features are not supported by conventional packet-switching technologies that are based on unicast model and software-configured switching and routing tables.

The fundamental difficulty in providing deterministic end-to-end QoS and optimized efficiency of network resource utilization is that packet traffic in service provider networks consists of a multitude of non-coordinateable individual variable-bandwidth traffic flows across the networks. Thus, unless traffic flows are rate controlled, network congestion can occur, resulting in packets getting delayed or lost before reaching their destinations, in which cases the packets must often be retransmitted, thus resulting in a single packet consuming network capacity (air-time) multiple times, thus further worsening the congestion. On the other hand, rate control defeats the original purpose and efficiency of packet-switching, i.e. to achieve higher data traffic throughput than with static circuit-switching, and in essence, plain standard circuit-switching could be used instead of rate-controlled packet-switching.

To accommodate variable-bit-rate packet traffic flows for constant-bit-rate L1 or L0 transmission, and in particular to provide congestion avoidance and specified QoS parameters, such as bursting tolerance e.g. for rate-controlled traffic, and thereby to reduce packet loss and retransmission rates, packet-switching nodes need to provide packet queuing capability. Packet queuing is conventionally implemented with electrical data storage elements, called buffers, which typically are implemented with RAMs. With rapidly increasing network interface data rate requirements, increasingly large date buffers are needed at packet-switches. Note that if the network system was able respond to a traffic burst, or link congestion or failure in one second (currently a non-realistic target), and that it should be able to buffer traffic for that response time to prevent packet loss, a 10 Gbps switch interface should be able to provide buffering for 10 Gb of data per each of its egress ports (that are subject to congestion). While 10 Gbps packet-switched network interfaces are in use as of writing this, the current maximum available RAM sizes are less than 1 Gb per chip. Furthermore, the maximum data throughput per a RAM chip currently is far below 10 Gbps, approximately at the 1 Gbps range. Thus there is a gap in the required switch interface data rate capacity and the feasible buffering capacity of the order of ten-to-one, which means that the conventional packet queuing techniques based on electrical data storage on RAMs is significantly limiting the maximum switch port data rates for which any type of QoS and congestion control can be provided. Additionally, as the largest available electrical data storage capacity can currently only be implemented using discrete off-chip RAM parts, the conventional packet queuing mechanisms result in complicated and costly switch hardware implementation.

However, at a properly engineered network, i.e. a network that it has an adequate amount of capacity to serve its access interfaces and that it has no single-point-of-global-failure, if a congestion occurs it is typically because a momentary demand for capacity on a certain route or link within the network, such as a server port, exceeds its physical capacity, while there at the same time are under-utilized alternative routes or links within the network. To utilize such alternative routes, that are under-utilized at the moment a packet-switching node makes a packet forwarding decision, the node would need to maintain a corresponding set of alternative next-hop destinations per a single packet forwarding identifier within its switching-table, and have real-time traffic load info for each of that set of alternative routes. These features, however, are not supported by the current unicast-oriented L3 routing or unicast and connection-oriented L2 switching techniques, which state of affairs thus is currently causing-sub-optimal utilization of network resources for dynamic packet traffic.

Furthermore, even if there was no alternative route to bypass a congested egress port of the network domain, in a properly engineered network, during the congestion on that particular overloaded link, there at the same time are under-utilized links, i.e. network fiber capacity having unused bandwidth. Thus, rather than trying to queue the packets destined for the congested link in electrical data buffers on packet switches, it would be more efficient to use the unused fiber bandwidth on non-congested network links as 'optical' buffering capacity. Obviously, a flexible and dynamic alternative routing capability, which is not supported by conventional packet switching techniques, would be necessary to utilize the unused network fiber bandwidth as optical data buffering capacity.

Also, it is worth to notice that most hops between L2 or L3 packet-switches when routing packets from their sources to their destinations are hops between packet switches administered by the same network operator, such as an Internet Service Provider, telecom carrier or a corporate network administrator. The packet-switches within the same network operator's constitute that operator's administrative domain (AD), which is delimited by border routers, such as Border Gateway Protocol (BGP-4) routers currently for IP, and Label Edge Routers (LERs) for MPLS, only through which nodes external traffic can be passed to or from that AD. Regarding the ADs, two points are worth to notice at this stage. First, when a packet arrives to a network operator's domain, the border router through which the packet arrives needs to be able to resolve to which one(s), if any, of the L3 border routers within the AD it should forward the packet to, and therefore there is no need for a single additional L3 packet switch node within the AD in addition to the border routers. Secondly, the domain-internal interfaces of the L3 border routers within the operator's AD can be addressed with completely independent interface identifiers by the administrator of the network domain.

Based on the above two points, it appears that the most straightforward way to perform packet forwarding within an AD would be to use simple connectionless packet switching network, which can be instructed by the border routers using simple, AD-local, packet forwarding instructions, to deliver each packet properly among the border routers of the AD. Such AD-local packet forwarding instruction, called a packet forwarding instruction tag (FIT), could be significantly simpler, yet more flexible for AD-local forwarding, than the currently used forwarding identifiers, such as ATM, MPLS or IP headers, as such AD-local FIT would only need to identify to which ones of the limited number of border gateways of the AD the packet should be delivered. It should be noted that a L2 packet switching network, instead of a static L1 circuit switching network, is preferred for interconnecting the border routers, since a regular L1 circuit switching network with its constant-bit-rate connections of coarse bandwidth granularity, is inefficient for delivery of variable bandwidth packet traffic.

Another common application for L2 switching, besides that of implementing the core of an AD that passed traffic between the border routers of the AD as discussed above, is that of passing packet traffic passing traffic between different ADs, i.e. between borders routers of different ADs. Such network systems over which Internet traffic is being passed between different communications service providers domains are called in the industry as Internet Exchange (IX) facilities or carrier-neutral peering points. In such applications, a semi-permanent L2 addressing and switching system is used to provide a controlled and neutral exchange of traffic between the border routers of different ADs. Again, a common packet switched network system is used to avoid having to build a mesh of dedicated L1 circuits interconnecting each pair of ADs that need to exchange traffic; the L2 switched exchange facility allows an AD to exchange all of its traffic with each other ADs present at the IX using a single share L1 port. Most importantly, the IX facility needs to deliver each packet to exactly that or those of the AD border routers connected by the exchange facility as instructed by the AD border router which passed the packet to the exchange facility. Thus, again, an optimal packet switching network system would deliver the packets between the border routers of the different ADs as indicated the FITs of each packet. Thereby it appears that the same type of a simple FIT-based packet-switching network or switch is optimal for both interconnecting the borders routers of a single AD and for interconnecting the borders routers of different ADs.

Based on the above discussion, there is a need for a new packet-forwarding method, such that efficiently supports multicasting and anycasting with, in addition to unicasting, and that provides dynamic load balancing and reliable and efficient packet-level traffic protection. Such a new packet-forwarding method should further efficiently support packet-forwarding with very high data rate network interfaces, and simplify the network management.

BRIEF SUMMARY OF THE INVENTION

The present invention provides a substantially simpler packet forwarding method that achieves a significantly better performance than the current packet forwarding techniques for delivering packet traffic across administrative domains of networks, as well as between different administrative domains. In particular, the invented packet forwarding method enables novel flexible and dynamic packet multicasting and anycasting, traffic load balancing and route optimization, and fast and efficient packet-level traffic protection re-routing. The invented packet forwarding method can be implemented as a downward-compatible enhancement to packet forwarding standards such as MPLS.

The invented packet forwarding method provides a way for Layer-N (N=2, 3 or above in the ISO OSI model) packet routing or switching nodes, called upper-layer nodes, to efficiently exchange traffic over a packet-layer protocol transparent packet-switching network domain. The method allows the upper-layer nodes to exchange packet traffic over a single statistically multiplexed point-to-point link per node, and to specify a set of primary and alternative next-hop destination upper-layer nodes per each packet by inserting a simple forwarding instruction tag (FIT) in the header of each packet. In summary, the novel FIT format of the present invention allows an upper-layer node to specify using a simple bit vector, called a Forwarding Enable Vector (FEV), to which ones of the next-hop upper-layer nodes reachable by the transparent network that network should deliver the packet; generally the network will deliver a packet to each such next-hop upper-layer destination node whose associated bit in the FEV of the packet was set to the active state. Such novel, brief form of FIT can be mapped e.g. to the MPLS or link layer headers of the packets, so that the transparent network domain will deliver each packet to an optimal set of the indicated upper-layer destinations along optimal routes, based on the FIT and on the real-time network status. The network status info considered by the transparent network when forwarding a packet includes the reachability of the next-hop upper-layer destinations indicated by the FIT and the current capacity available on alternative routes to those upper-layer nodes.

In brief, the present invention provides a method for existing upper-layer nodes, such as IP or MPLS routers, to exchange packets over a transparent packet-switching network simply by inserting a flexible and efficient forwarding instruction directly into the header of each packet, based on which, and on the network status, that transparent network delivers the packets. Thereby, the packet forwarding method of the present invention enables to eliminate the step of conventional packet-forwarding methods of having to look-up the forwarding instruction from a route information database for each packet based on the header of the packet. I.e., a packet-switching network that uses the forwarding method of the present invention reads the forwarding instruction for each packet directly from the packet header, instead of searching the forwarding instruction from a separate route table. Furthermore, the forwarding instruction format of the present invention enables efficient multicasting, dynamic load-balancing, fast protection re-routing, as well as scalable, high-throughput packet-switched networking overall.

DETAILED DESCRIPTION OF THE INVENTION

The invention is described herein first by illustrating the novel concepts via a more detailed discussion of the drawings, and then by providing specifications for a currently preferred embodiment of the invention.

Figure 1:
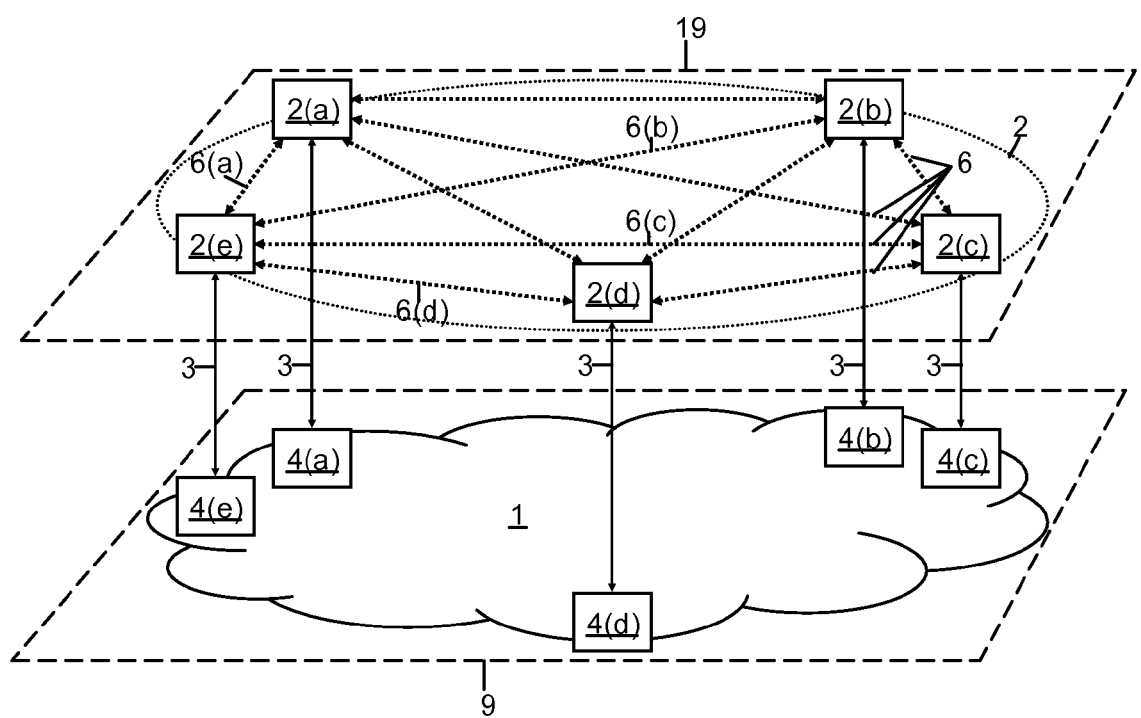
FIG. 1 presents an example of a transparent network domain employing the packet forwarding method of the present invention, in an application of delivering data packets among a set of upper-layer-nodes such as IP routers.

Symbols and notations used in the drawings:
- Solid arrows indicate a communications signal i.e. data traffic flow. Dotted arrows between network elements (drawn as boxes) indicate direct i.e. transparent connectivity at the packet-layer. Gapped arrows indicate a route of a traffic flow across network.
- Boxes represent network elements, such as a packet-switch nodes.
- Cloud shapes, such as the one below the packet-switches 2 in FIG. 1, present an abstraction of a physical network interconnecting the nodes (4 in FIG. 1) on its edges.
- Circular, dotted-line, shapes mark a border of a group of drawn elements that form a logical entity, such as the set 2 of packet-switching nodes, elements 2(a) through 2(e), on the upper network layer 19, in FIG. 1, or the cluster 80 of network systems 1 in FIG. 8.
- In FIGS. 3 and 4, the boxes, such as 39 and 30, indicate data packets or portions i.e. bit fields of data packets. The (semi-)vertical dotted lines between the boxes indicate that a portion of a data packet delimited by the dotted lines is presented below with a greater internal detail (in an enlarged scale).
- Lines or arrows crossing in the drawings are decoupled unless otherwise marked.

FIG. 1 presents an example of a network system 1, the subject matter of the present invention, in an application where it is used to deliver data packets among a set 2 of upper-layer nodes, 2(a) through 2(e), which could be e.g. MPLS switches. The upper-layer nodes delimit the network system 1 as a single administrative domain, within which the administrator of the domain can use an internal node addressing scheme for delivering data packets among the upper-layer nodes 2. Although FIG. 1 presents only five such upper-layer nodes, the network system 1 can be used to deliver packets among virtually any number of upper-layer nodes. The upper plane 19 on which the upper-layer nodes are drawn on, symbolizes a packet-switching network layer Layer-N, such as L2 or L3 in the OSI model of ISO. The lower plane 9 is the network protocol layer, i.e. Layer-(N−1), below that of the plane 19 in the layered network model, and it is intended to provide transparent delivery of Layer-N packets among the Layer-N nodes 2. Due to such intended upper-layer-protocol transparency of the lower network layer 9, the upper-layer 19 nodes 2, when interconnected by a transparent interconnect network 1, see each other as next-hop destinations to each other.

Figure 9:
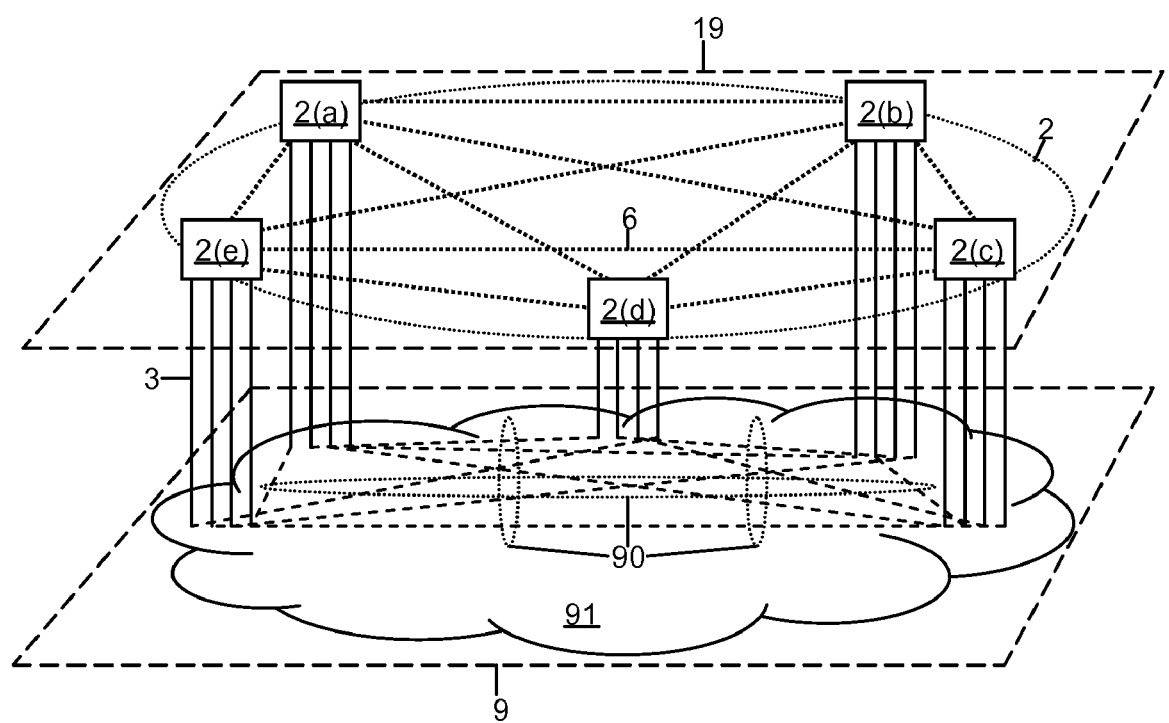
FIG. 9 presents, for comparison purposes, a conventional alternative for the application of interconnecting upper-layer nodes, such as IP (L3) routers, over a lower-layer, e.g. ATM (L2) network.

The Layer-N nodes 2 interface with each other using Layer-(N−1) connections 3. Such Layer-(N−1) connections or network interfaces 3 are normally two-directional, comprising a network ingress port, for passing traffic from an upper layer 19 node 2 to the interconnect network 1 (or 91 in FIG. 9), and a network egress port, for passing traffic from the interconnect network to an upper-layer node 2. In a conventional network, such as shown in FIG. 9, a Layer-N node would need a dedicated Layer-(N−1) 9 connection 3 to each Layer-N 19 node to which it needs a direct i.e. packet-layer transparent connection 6. With a Layer-(N−1) network system utilizing the Layer-N-transparent packet forwarding method of the present invention, however, the set 2 of Layer-N nodes can interface with each other over transparent full-mesh 6 with using only a single Layer-(N−1) connection 3 per a Layer-N node. (Even though only the those of the full-mesh connections that terminate at the Layer-N node 2(c) are pointed by the reference character 6, it should be understood that each the dotted arrow terminating at any of the Layer-N nodes 2 are part of the full-mesh.)

It needs to be noted that while the network system 1, due to its innovative packet forwarding method, thus reduces the count of Layer-(N−1) connections required to achieve direct, transparent full-mesh connectivity among the Layer-N packet-switches 2 by a factor directly proportional to the number of meshed Layer-N nodes, and thereby substantially simplifies the network implementation and management, the network system 1 also provides deterministic QoS for the traffic flows 6 between each of the set of Layer-N nodes 2. Thus, for instance in an application of interconnecting a set 2 of IP routers of an ISP, the network system 1 is able to provide deterministic IP (L3) QoS without having to use a mesh of L2 connections, such as ATM virtual circuits, between the said set of L3 routers. Note further than when the network system 1 uses the embedded control plane and dynamic POS data plane principles disclosed in the referenced provisional patent application [2], the Layer(N−1) network system 1 is able to provide at the same time both guaranteed minimum Layer-N bandwidth as well as ability to utilize all the available bandwidth for connections between the set 2 of Layer-N 19 nodes, which capabilities generally cannot be provided by current packet-switching and forwarding techniques.

A practical application example for a network architecture of FIG. 1 is an Internet backbone of an ISP, wherein the IP/MPLS routers 2 of the ISP, located on the edges of the network AD of the ISP, e.g. at POPs in different cities, exchange traffic mutually over the network system 1, which operates as a fast inter-POP Internet backbone for the ISP.

Figure 2:
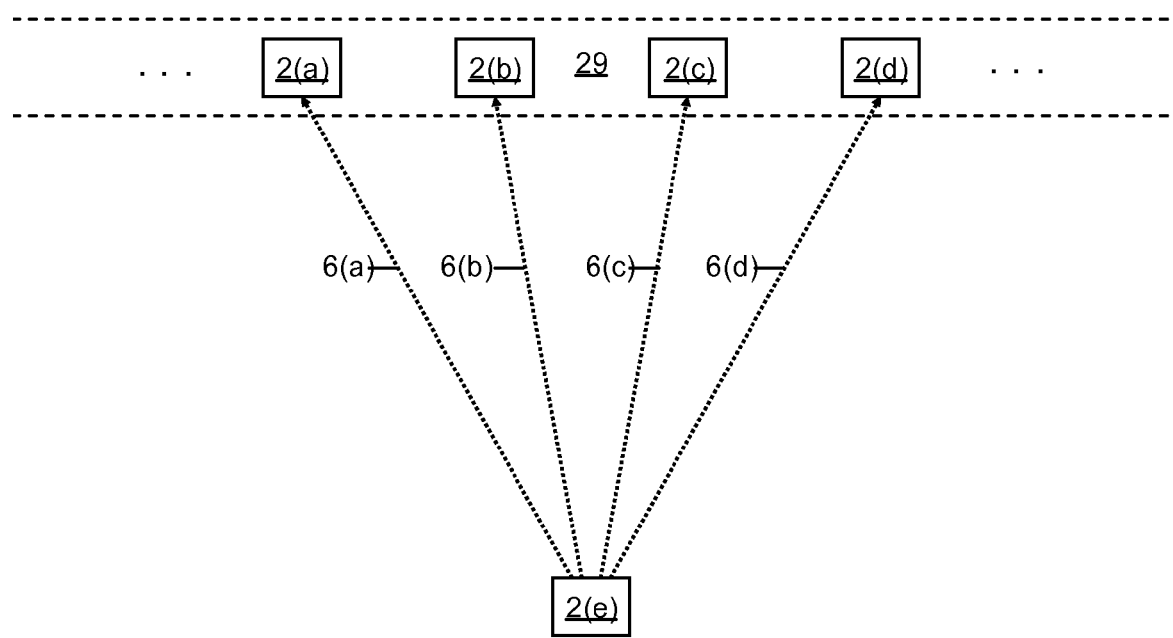
FIG. 2 presents how the remote upper-layer nodes reachable by the transparent network domain can be presented to any chosen one of the packet-switching nodes as organized in a row, with each element of such row representing one of the remote packet.

FIG. 2 presents how the remote upper-layer 19 nodes 2 reachable by the network system 1 can be presented and appear to any chosen one of the upper-layer nodes as a row 29 of horizontally organized elements, wherein each element represents one of the next-hop upper-layer 19 nodes directly reachable through the network system 1. The network system 1 can provide Layer-N-protocol transparent connectivity to virtually any number of next-hop Layer-N destinations for a Layer-N node, such as the node 2(*e*), that has even a single Layer-(N−1) connection to the network system 1. In FIG. 2, the remote upper-layer nodes of the set 2 are presented as they appear to the node 2(*e*) through the network system 1.

Figure 3:
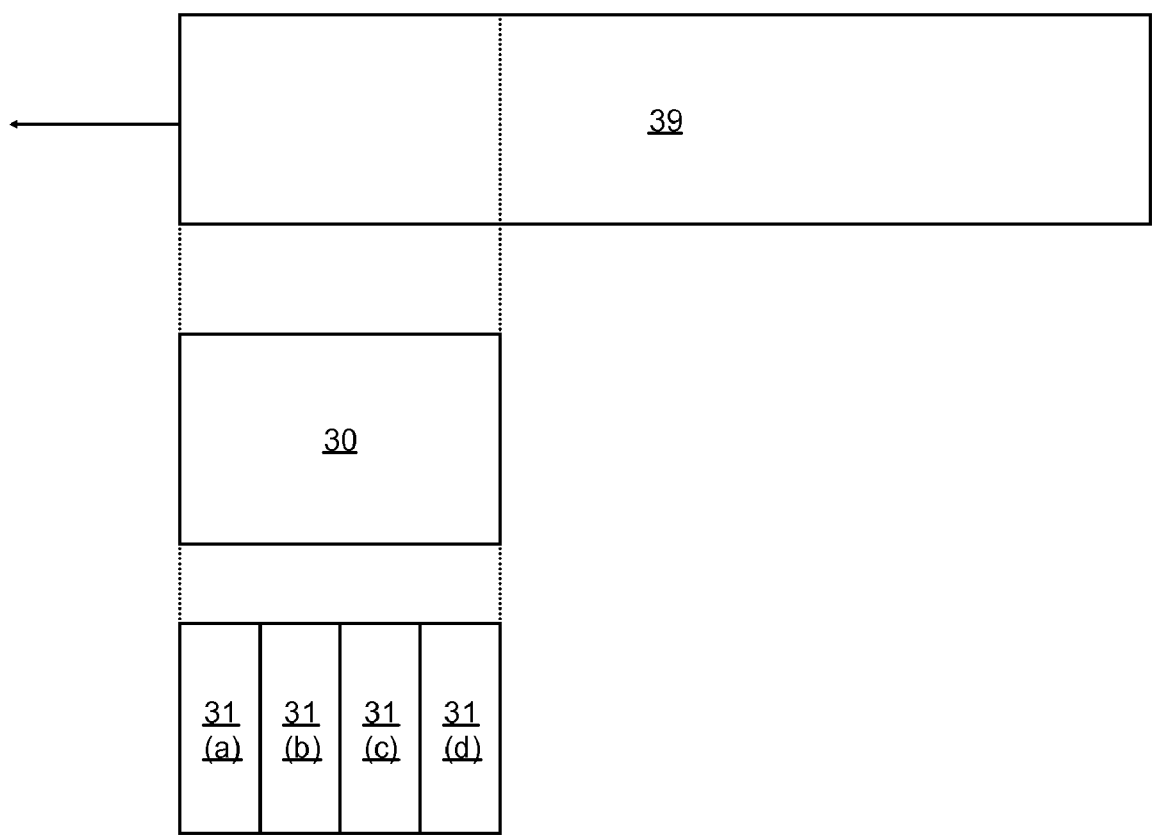
FIG. 3 presents a simple forwarding identifier field of a data packet; a bit vector within the packet header wherein each bit indicates whether the network domain should deliver the packet to its corresponding remote upper-layer node.

FIG. 3 presents a data packet 39 with a simple forwarding identifier, called a forwarding instruction tag (FIT), configured by an upper-layer node in the packet overhead. In such a simple form, the FIT is a bit vector, called Forwarding Enable Vector (FEV) 30, wherein each one of its bits 31(*a*) through 31(*d*) is an explicit and individualized indication of whether the network domain should deliver the packet to the next-hop Layer-N destination with a corresponding position within the next-hop destination presentation row 29. The same way as a network system 1 can deliver Layer-N packets among any number of Layer-N nodes 2, so can also the FEV contain any number of bits, even though in FIG. 3, there are only four bits in the FEV 30. In a general sense, the FEV of a packet specifies to which one(s) of the next-hop destinations, when considered to be organized in a row 29, the network system is enabled to deliver the packet.

In the case of FIG. 2., i.e. for delivering packets 39 from the Layer-N node 2(*e*) to the nodes 2(*a*), 2(*b*), 2(*c*) and 2(*d*) through network domain 1, the first bit 31(*a*) of the FEV 30 acts as the forwarding enable bit towards the left-most node 2(*a*) in the row 29, the second bit 31(*b*) towards the node 2(*b*), the third bit 31(*c*) towards the node 2(*c*), and the fourth bit 31(*d*) towards the right-most node 2(*d*) in the row 29. Thus, for instance, for the node 2(*e*) to get a packet delivered to nodes 2(*b*) and 2(*d*), it simply sets up the corresponding bits 31(*b*) and 31(*d*) in the FEV 30 of the packet, which will instruct the network system 1 to deliver the packet to its interfaces leading to the Layer-N nodes 2(*b*) and 2(*d*).

It is hereby seen that the simple forwarding method of the present invention, which uses a FEV 30 of the format as shown in FIG. 2. as the packet forwarding identifier, does not require using any forwarding instruction look-up tables or other type of switching or routing tables or content-addresses memories (CAMs) to do packet forwarding decisions and to deliver the packet to the right destinations of the set of reachable destinations. Conventional packet-switching, such as standard MPLS or ATM switching, requires resolving a pre-configured next-hop forwarding port and a new forwarding or link identifier or label for each forwarded packet, by using the incoming forwarding identifier as a search key to switching-tables. Such conventional packet-switching naturally requires implementing, pre-configuring and managing the said packet switching-tables at each packet-switching point in the network, which of course is significantly more complicated and costlier than the explicit next-hop destination specific forwarding enable scheme, i.e. the FEV 30, of the present invention. I.e., in a conventional packet-forwarding scheme, the Layer-N node would need to specify the next-hop Layer-N destination of a packet, which it passes for a conventional inter-connect network, using a Layer-(N−1) 'address' or a link identifier in the forwarding identifier of the packet, and the conventional interconnect network system would then resolve the route to the proper next-hop destination by looking up the next forwarding ports and link identifiers from related switching-tables at each Layer-(N−1) packet-switching point between the Layer-N nodes.

It is further seen that the forwarding method of the present invention, while significantly simpler than conventional packet forwarding methods, does however enable efficient packet multicasting, in addition to unicasting, without the network implementational and management complexity associated with conventional multicast groups.

Figure 4:
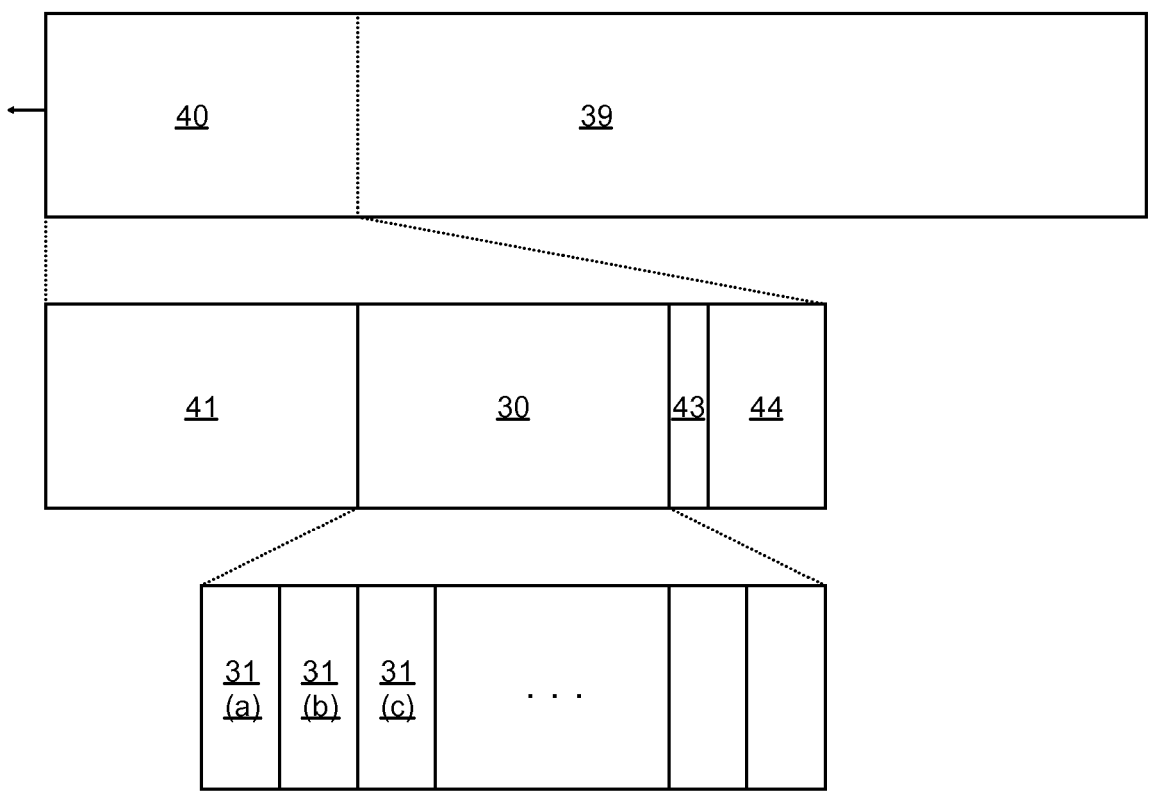
FIG. 4 presents an augmented forwarding instruction format, including primary and alternative next-hop destination fields.
Figure 7:
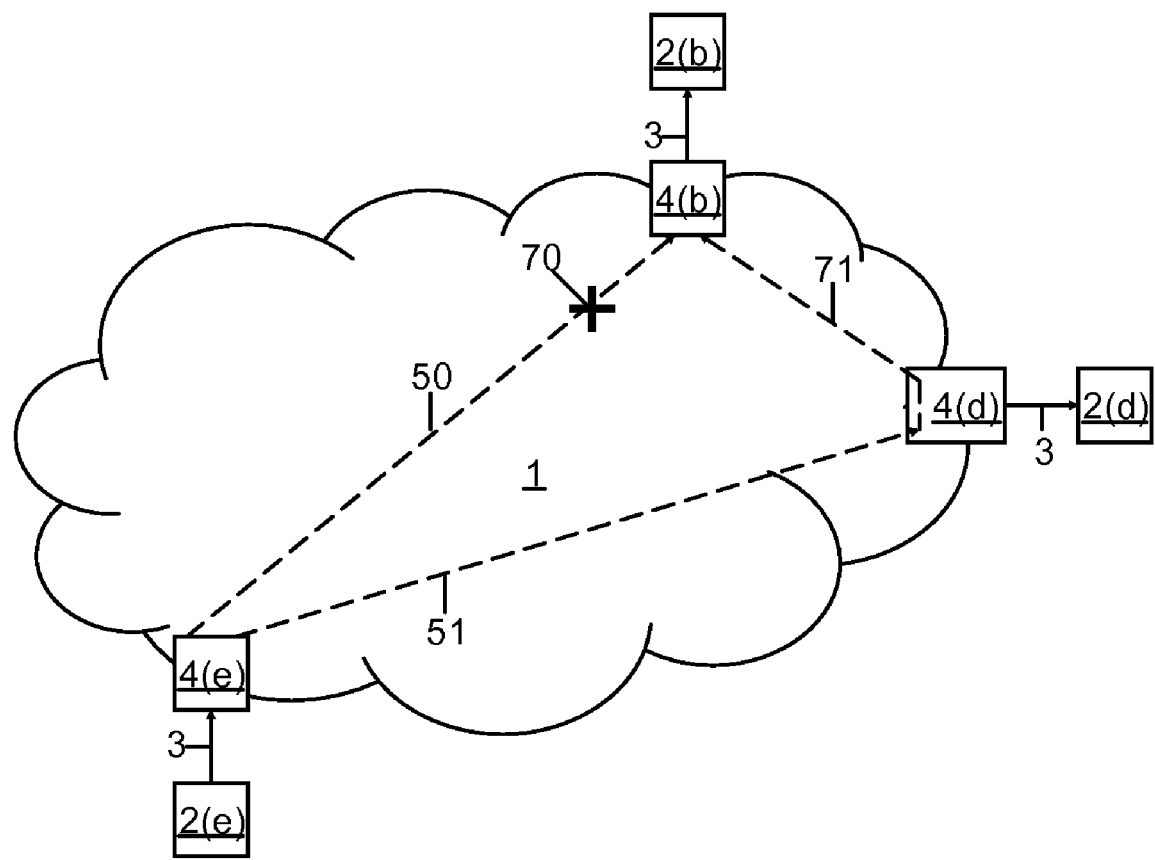
FIG. 7 presents the capability of the transparent network domain utilizing the present invention to deliver a packet over an alternative route within the network domain to its primary next-hop destination during a failure or a congestion associated with the normally used shorter route to that destination, thereby using the available transmission bandwidth within the network domain as an optical buffer capacity.

FIG. 4 presents an augmented format of a FIT 40, such that includes primary and alternative next-hop destination fields. Like the FIT format of FIG. 3, also this augmented FIT is inserted to a header of a packet 39 by the upper layer 19 network elements 2 for them to instruct the network system 1 to deliver each packet to appropriate next-hop upper layer destination(s). The semantics of the sub-fields of the FIT 40 are as follows:

The sub-field 41 is called a primary destination ID#. It is used to carry the network domain 1-scope unique identifier of the primary next-hop upper-layer 19 destination node for the packet 39, if applicable. This field is of use in network testing purposes, and also during normal operation, e.g. when a packet has to be routed across the network domain 1 to its next-hop packet-layer 19 destination via an intermediate packet forwarding point within the network domain 1, in which case the intermediate packet forwarding point(s) recognize from the sub-field 41 that they may need to re-forward the packet toward its primary destination, which operation is illustrated in FIG. 7. Certain values of this field can be reserved for a special purpose. E.g., a pre-definable code, such as value 0, on this field can be used to indicate that the packet is an anycast packet.

The sub-field 30 is the FEV described already above in association with the FIG. 3. For anycast packets, the network system 1 delivers the packet to such one of the reachable next-hop destinations of an anycast group indicated by the FEV that has an adequately low or the lowest level of traffic load.

The sub-field 43 is an Explicit Alternative Destination-Enable (EADE) indicator bit. If that bit is not set, the packet may not be forwarded to an alternative destination but to the primary destination specified by FEV, unless the sub-field 44 is set to a value enabling default alternative destination forwarding, in which case the packet may be forwarded to a pre-definable default alternative destination when its primary destination is congested. In the preferred embodiment, such a default alternative destination can be configured individually per each of the next-hop destinations reachable by the network domain 1. If EADE is set, the sub-field 44 specifies the alternative destination in case of a congestion or a failure associated with the route to the primary next-hop destination of the packet.

In sub-field 44, the alternative destination is identified by specifying the index number of its corresponding bit in the FEV 30. When EADE 43 is not set, a pre-definable code, such as all ones, is used to enable default alternative destination forwarding.

It is worth to notice that for up to eight next-hop destinations, and up to 128 unique primary destination field values, the FIT 40 of FIG. 4 can be presented in twenty bits, so that it fits in to a single 20-bit Label field of the standard MPLS label stack entry form. That way, any the 20-bit FIT 40 used as the destination specification part of the forwarding instruction for network system 1 can be treated as a regular MPLS Label by the upper layer network elements 2.

Moreover, the rest of the bit fields in a standard 32-bit MPLS label stack entry, i.e. its twelve least significant bits can be used in a completely standard fashion when using network system 1, the subject matter of present invention, to deliver MPLS packets among a group of MPLS LSRs or LERs. Naturally, the FIT 40 of FIG. 4 can also be shorter or longer than twenty bits, and it can be mapped to other packet protocol headers than that of MPLS, for instance to a 20-bit Flow Label field of an IPv6 packet, or to a 24-bit Frame Relay Logical Data Link Identifier field.

Table B-3-5-2 and associated descriptions of the Appendix B of the referenced patent application [2] provide detailed network system engineering specifications for a practical implementation of the forwarding scheme of the present invention in an application of interconnecting MPLS-switches over a SDH/SONET transport network.

Naturally, all or some of the benefits enabled by the forwarding method of the present invention may be achieved using a packet forwarding identifier that has the subfields of the FIT 40 in different order and/or in different formats than shown in FIG. 7, or that does not have all the sub-fields of FIG. 7, or that has additional sub-fields than those shown in FIG. 7.

Figure 5:
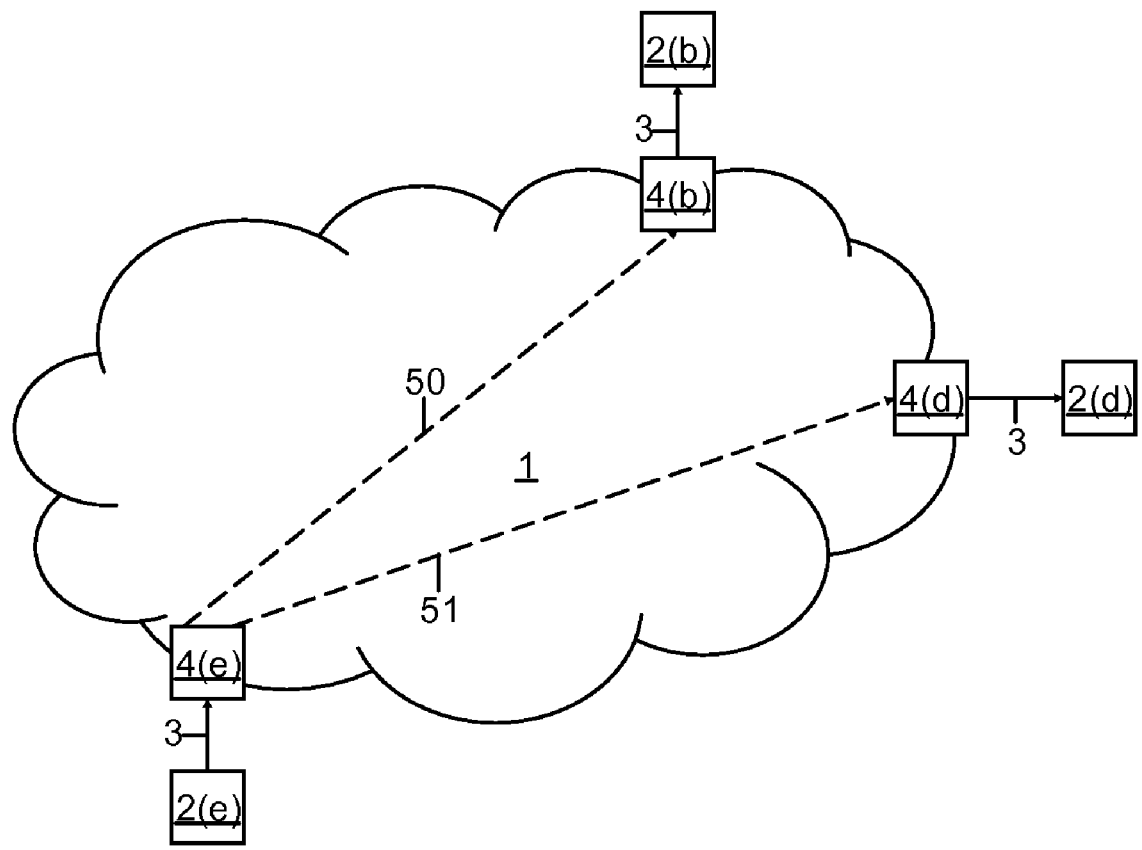
FIG. 5 presents the capability of the transparent network domain utilizing the present invention to forward a packet to a better one of two alternative next-hop destinations indicated by the forwarding identifier of the packet.

FIG. 5 Presents the capability of the network domain 1 utilizing the present invention to forward a packet 39 to a better one of two alternative next-hop destinations, which in FIG. 5 are presented by upper-layer nodes 2(*b*) and 2(*d*), indicated by the forwarding identifier 40, or plain FEV 30, of the packet. This traffic protection and route or server load balancing capability of network system 1 functions as follows:

Upon receiving a data packet 39 from a packet-layer 19 node, presented in FIG. 5 by node 2(*e*), the network system 1 IFU 4(*e*) on which the packet 39 arrived will determine the intended next-hop upper-layer 19 destination(s) for the packet based on the FIT 40 of the packet 39. If the FIT of the packet had an anycast indication, which could be such as a value of 0 in the sub-field 41 of the FIT, those of next-hop destinations to which the FEV 30 enables forwarding the packet, form an anycast group for that packet. In FIG. 5, such anycast group is presented by nodes 2(*b*) and 2(*d*) in FIG. 5. The network system will deliver an anycast packet to such reachable next-hop destination of its anycast group that, at the moment the packet arrives on the network system 1, has the least level of traffic load or a sufficiently low level of traffic load on the network route leading to it.

The network system 1 determines the traffic load level on a route by monitoring the amount of data queued in a data buffer for future transmission on the said route; the more data queued on the buffer the higher the traffic load level on its associated route. If the amount of data queued on such a data buffer is above a pre-definable threshold value, the route is said to be under congestion.

The above described packet-level traffic protection and load-balancing method is done by the network system 1, the subject matter of the present invention, individually per each packet it receives from an upper-layer 19 node for delivery to a next-hop upper-layer 19 destination, based on real-time route status, which network system 1 monitors via continuously measuring the traffic load level and periodically checking the destination reachability for each route across it. In the preferred embodiment, the reachability of the next-hop destinations is determined within the network system 1 based on periodic control-plane messaging such as described in the Control Plane section of the Appendix B of the referenced patent application [2]. Therefore, the present invention, i.e. network system 1, is able to perform fast packet-level traffic-protection and maximize the network throughput via real-time load-balancing.

Figure 6:
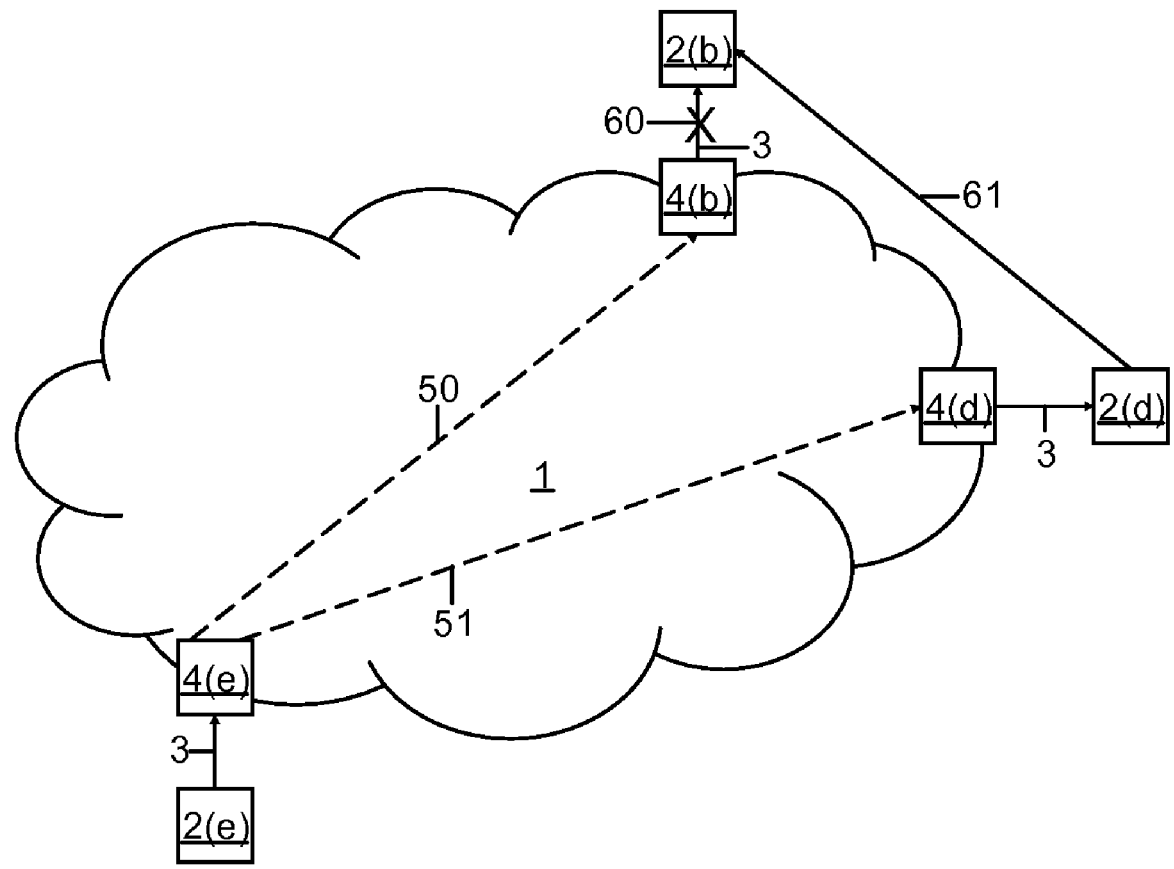
FIG. 6 presents the capability of the transparent network domain utilizing the present invention to forward a packet over an alternative route to its primary next-hop destination during a failure or a congestion associated with the normally used shorter route to that destination.

FIG. 6 presents the capability of the network system 1 utilizing the present invention to forward a packet over an alternative route 61 to its primary next-hop destination 2(*b*) during a congestion or a failure 60 associated with the direct route 50 to that destination. This traffic protection and alternative routing capability of network system 1 is a variant of that presented in FIG. 5. FIG. 5 assumes that the two alternative next-hop destinations 2(*b*) and are of equal priority, and thus the packet should be forward to the less loaded one of them. In the case of FIG. 6, however, the route along the node 2(*d*) is longer, and thus in that case the node 2(*b*) is the primary and the node 2(*d*) an alternative next-hop destination, and therefore the network system 1 delivers a packet with such forwarding instructions 40 along the direct route 50 to its primary destination 2(*b*) whenever possible, and uses the alternative route 61, of which the route 51 to the intermediate destination 2(*d*) is a part of, only when the packet can not be delivered via its primary route. Thus, in this case, the direct route 50 to the primary next-hop destination 2(*b*) has a higher selection priority than the alternative route 61. The operation of the network system 1 in this scenario is as follows:

Upon receiving a data packet 30 from a packet-layer 19 node, presented in FIG. 6 by node 2(*e*), the network system 1 IFU 4(*e*) on which the packet 30 arrived will determine the intended next-hop packet-layer 19 destination(s) for the packet based on the FIT 40 of the packet 39. If the sub-fields 43 and 44 of the FIT indicate that the packet may be forwarded to an alternative next-hop destination at the upper-layer 19, the network system 1 forwards the packet towards such an alternative destination, presented by node 2(*d*) in FIG. 5, along the alternative route 51, when the direct route 50 to the primary destination, presented by node 2(*b*) in FIG. 5, and indicated by the FEV 30 of the packet, is affected by a congestion or a failure 60; otherwise network system 1 forwards the packet to its primary destination 2(*b*) along the route 50.

The scenarios of FIGS. 5 and 6 are variants of the general packet-level traffic and real-time load-balancing capabilities of the present invention, and it should be understood that both the anycast forwarding and the prioritized alternative next-hop destination unicast forwarding schemes can be used in each type of case, and in any variant thereof. For instance, in the case of FIG. 5, the alternative next-hop destinations 2(*b*) and 2(*d*) could be mutually prioritized, e.g. so that 2(*e*) has a higher selection priority, in which case the IFU 4(*e*) would forward a packet, whose FIT indicates that it should be delivered to either 2(*b*) or 2(*d*), to node 2(*d*) whenever possible.

FIG. 7 presents the capability of the network system 1 utilizing the present invention to deliver a packet over an alternative route 71 within the network domain 1 to its primary next-hop destination, presented by node 2(*d*) in FIG. 7, during a congestion or a failure 70 associated with the normally used shorter route 50 to that destination. The scenario in FIG. 7 is thus a variant of that of FIG. 6, with the difference that in the case of FIG. 7 the primary next-hop destination 2(*d*) of the packet is considered to be not reachable from the node 2(*b*) via any route outside of network system 1, and thus the network system 1 needs to complete alternative route from the intermediate forwarding point 4(*d*) to the primary next-hop destination 2(*b*) of the packet using its internal resources, even when the direct route 50, the only route enabled by the FIT 40 (or FEV 30) of the packet, is not be usable. The operation of the network system 1 in such a case where the network system 1 has to deliver a packet to its next-hop destination using a dynamically discovered internal alternative route 71, due to a congestion or failure along the network system-internal part of the direct route 50 to its next-hop destination, is as follows:

Upon receiving a data packet 39 from a packet-layer 19 node, presented in FIG. 7 by node 2(e), the network system 1 IFU 4(e) on which the packet 39 arrived will determine the intended next-hop packet-layer 19 destination(s) for the packet based on the FIT 40 of the packet 39. If the sub-fields 43 and 44 of the FIT indicate that the packet may not be forwarded to a next-hop destination other than the only one (node 2(b) in FIG. 7) enabled by the FEV 30, the network system functions as follows:

Whenever the primary next-hop destination 2(b) is reachable via the direct route 50 indicated by the FIT, the network system 1 delivers the packet to its next-hop destination using that route.

If the direct route 50 to the indicated primary next-hop destination 2(b) is affected by a network system 1-internal congestion or failure 70, the network system 1 will route the packet to its primary next-hop destination 2(b) via an internal forwarding point 4(d) such that can under normal conditions re-forward the packet toward its primary next-hop destination 2(b). Such intermediate packet forwarding point 4(d) within the network domain 1 detects from the FIT 40 of the packet, in part based on its sub-field 41, that it needs to re-forward the packet toward its primary next-hop destination, rather than pass the packet on to its adjacent upper-layer 19 node, which in FIG. 7 is presented by node 2(d). The network system IFU 4(d) acting as an intermediate packet forwarding point will forward the packet based on its source IFU (4(e) in FIG. 7) and based on its primary destination ID#, presented by the FIT sub-field 41, toward its primary next-hop destination 2(b) the same way the IFU 4(e) on which the packet arrived the network system 1, i.e. it will deliver the packet to the primary next-hop destination 2(d) along the shortest route from that location, i.e. route 71, whenever the next-hop destination 2(b) is reachable from 4(d) along that route 71, and use another internally discovered alternative route otherwise. It should be noted that by configuring the default alternative routes (such as route 71, from 4(e) via 4(d) to 4(b) in the case of FIG. 7) within the network domain 1 properly per each primary route (such as route 50 from 4(e) to 4(b) in FIG. 7), the intermediate packet re-forwarding points (such as 4(d) in FIG. 7) can resolve that a packet need to be re-forwarded towards a particular primary next-hop destination (node 2(b) in FIG. 7) based alone on a non-local value in the destination ID#41 of the packet and the direct L1 connection on which the packet arrived to that re-forwarding point, i.e. again without the use of a forwarding look-up table. Each re-forwarding point (such as 4(d) in FIG. 7) along the route of a packet across network domain 1 will decrement the Time-To-Live (TTL) figure of the packet by one, unless the TTL has reached value 1, at which point the packet is discarded to prevent a packet from looping around in the network domain endlessly.

In addition to providing fast packet-level traffic protection re-routing, the alternative routing capability of network system 1 presented in FIG. 7 also enables to use any currently available network fiber capacity as optical buffering capacity, thereby maximizing traffic burst tolerance while minimizing packet loss and electrical buffering capacity requirement within the network system 1. For instance, if the network system IFU 4(e), due to a congestion on the route 50, had no electrical buffering capacity available to store an additional packet in a queue for future delivery along the route 50 to node 2(b), it may forward the packet towards an intermediate packet forwarding point, such that whose associated buffer at the IFU 4(e) can accommodate additional data, to prevent packet loss. When the packet is being re-forwarded at the intermediate forwarding point, such as IFU 4(e) in FIG. 7, the congestion toward the packet next-hop destination 2(b) likely has been reduced to a level at which that intermediate forwarding point has electrical data buffer space available to queue the packet for delivery towards the next-hop destination 2(b) of the packet.

A practical example of the scenario of FIG. 7, wherein a packet needs to be delivered to no other next-hop destination at the upper-layer 19 than the one indicated by its FIT is an Internet Exchange facility (IX) where Internet traffic is being passed between different ISP's networks. In such case, a border router 2 of one of the ISPs present at that IX specifies using a FIT 40 for the network system 1, through which the ISPs physically exchange traffic, to which one of the other service providers' border routers 2, which appear as organized in a row 29 when seen through any network ingress interface 3, each packet should be delivered. By using e.g. link-aggregated or otherwise protected point-to-point links 3 between the service providers border routers 2 and the network system 1, an efficient Internet Exchange facility, providing IP-transparent and end-to-end protected full-mesh connectivity is accomplished. It is thus seen that the novel forwarding scheme of network system 1 works both as an internal backbone solution within a single administrative network domain, as well as it works as a traffic exchange facility between different administrative domains.

Figure 8:
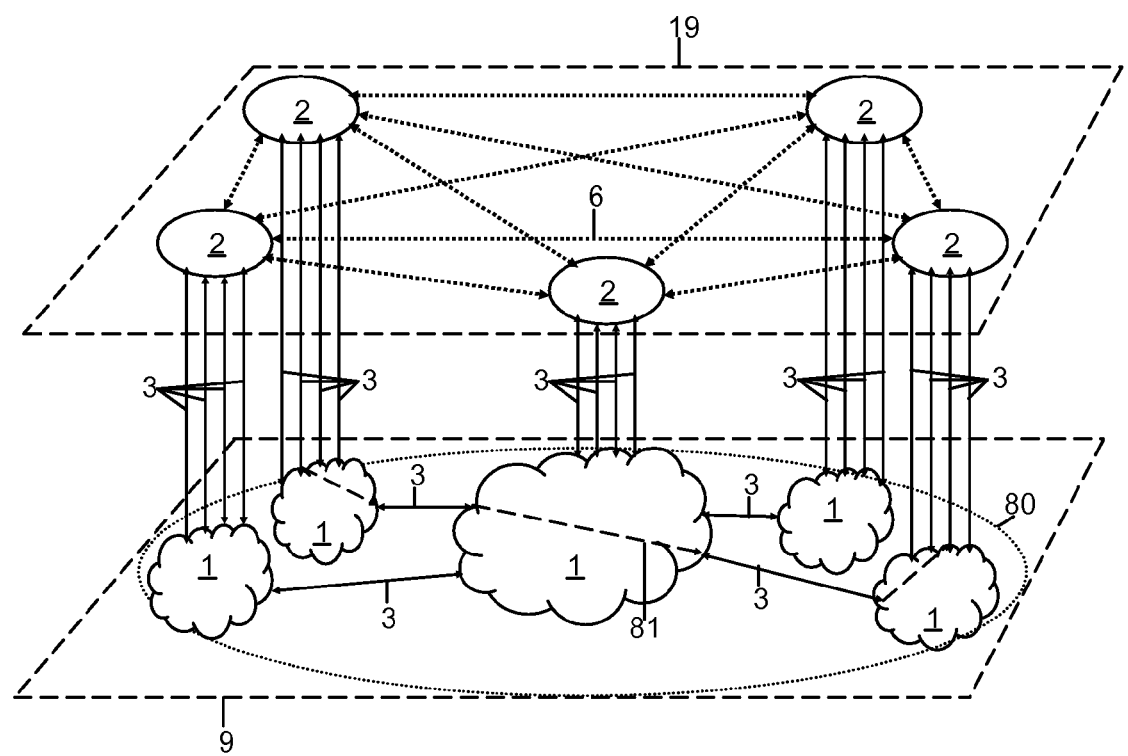
FIG. 8 presents a cluster of transparent network domains, each the forwarding method of the present invention.

FIG. 8 presents a clustered network system 80 containing multiple member network systems 1, wherein some of the interfaces 3, normally PPP links, of the member network systems 1 of the cluster 80 are interfaces between two different network systems 1, while others are interfaces between the network systems 1 and the upper-layer 19 nodes 2. A practical application of the type of hierarchical network architecture shown in FIG. 8 is an inter-city Internet backbone, wherein the directly meshed member parts, 2 and 1, of the network cluster 80 represent intra-city metropolitan area networks (MANs) within the individual cities connected by the backbone. The significance of the individual network systems 1 within the cluster 80 is that to route a packet 39 across such cluster, the source upper-layer node 2 can configure a dedicated FIT, which could be mapped e.g. to an MPLS label stack entry (LSE), per each individual network system 1 along the intended path of the (MPLS) packet across the cluster 80 to its next-hop upper-layer 19 destination node. An example of a possible route of a packet across the cluster 80 is presented in FIG. 8 by the route 81, which extends across three individual network systems and thus can be specified with a stack of three network system 1 specific FITs configured into the packet header. On the way across such cluster 80 of network systems 1, each network system deletes its own FIT, i.e. pops the top MPLS LSE (shim), so that the next network system along the route will deliver the packet based on the new top i.e. the first FIT (MPLS shim) in the stack, which FIT was configured specifically for that particular network system 1 with the cluster 80. The benefit of such extensible FIT forwarding scheme naturally is that it enables upper-layer-protocol transparent delivery of packets among unlimited number of upper-layer 19 nodes, with using short and fixed-length FITs, such as those presented in FIGS. 3 and 4, at the individual member network systems 1 of the cluster that interconnects the multitude of upper-layer 19 nodes. This in turn enables well scalable and fast packet forwarding over even very large packet-switched backbone networks. Finally, it should be understood that neither a single network system 1 nor a cluster 80 of network systems 1 has any limitations regarding its geographical scope. For instance, the IFUs 4 of the member network systems 1 of a cluster 80 can be located anywhere in the world.

FIG. 9 presents, for comparison purposes, a conventional alternative for the application of interconnecting upper-layer nodes (such as IP routers) over a lower-layer (e.g. ATM, a L2 protocol) network 91. All communications links in FIG. 9, i.e. the groups 3, 6 and 90, are two-directional even though no direction is shown. It is seen that using a conventional pre-configured lower layer 9 mesh 90, the upper-layer 19 network elements would essentially need to implement all the fast traffic protection and load-balancing intelligence of the network system 1 described above in order to achieve equal network performance. Trying to do that would however be difficult since the upper-layer network elements do not have real-time status, e.g. route load-level and failure, information of the lower-level interconnect network, which in practice may be a large multi-stage mesh, and thus it appears that the solution provided by the present invention, i.e. the network system 1 using a novel packet forwarding method, enabling efficient multi- and anycasting, fast packet-level protection, and real-time load balancing based throughput maximization, is a more practical alternative.

DESCRIPTION OF PREFERRED EMBODIMENT

Introduction

A currently preferred embodiment of the present invention is described in the following first via a generic system description focusing on the novel characteristics of the network system 1. That is followed by detail system specifications for a practical system implementation.

System Description

Transparency and Architectural Efficiency:

A currently preferred embodiment of the present invention is a network system 1 that uses FITs 40 that are mapped to Label fields of MPLS LSEs. Such embodiment of the invention is able to deliver transparently, i.e. without modification, multi-protocol data packets among a set of packet-switching nodes, such as MPLS Label Edge Routers (LERs). Thus, the packet-switches such as MPLS LERs interconnected will interface with each other over the network system 1 essentially as if they were interconnected over direct inter-switch point-to-point links. However, using the network system 1 reduces the L2 port 3 count requirement by a factor of N (an integer) for a packet-switch that needs direct L2 connectivity with N other packet switches, thereby substantially simplifying the network and optimizing the efficiency of network resource utilization.

Fast Packet-Level Protection:

The network system 1, when implemented over a fiber ring based physical topology, provides at least two alternative routes between any two IFUs 4 of the network system, so that there is no single point of failure (NSPF) within the network system 1. The control plane of network system 1, such as the one described in Appendix B of the referenced patent application [2], periodically, once every 1 ms, exchanges network control and status messages, which include reachability info of the IFUs 4 and the upper-layer nodes 2 interconnected by the network system 1, and based on which the network system 1 is able to route the packets across it to their correct next-hop destinations along the optimal working route. Thus, as the network system 1 provides fast (sub-50 ms) packet traffic protection re-routing in case of an internal failure (such as 70 in FIG. 7), an end-to-end NSPF-protected connectivity can be accomplished among the packet switching nodes 2 by using doubled, i.e., link-aggregated or 1:1 or 1+1 protected point-to-point links as the data interfaces 3 between the network system 1 and the set of packet-switching nodes 2 it interconnects.

Load Balancing and Global Network Throughput Maximization:

The internal L1 connections between the IFUs 4 within the network system 1 may be of different data rate than the point-to-point links 3 between the IFUs 4 and their adjacent packet-switching nodes 2. Thus, an IFU, which forwards packets that it receives over its ingress-direction point-to-point link 3 to the other IFUs of the network system 1 over the network system 1 -internal L1 connections, may over some period of time need to forward data toward a certain IFU of the network system 1 at a higher data rate than what is the capacity of the L1 connection to that IFU over that period of time. To prevent packets being lost in such cases, the IFU 4 provides a data buffer in which it is able to temporarily store i.e. queue packets for future transmission across the network system to a destination IFU associated with the buffer. However, if an upper-layer 19 node 2 transmits data to another upper-layer node over the network system 1 persistently at a rate exceeding the data rate of the corresponding network system-internal L1 connection, the data buffer will fill up. To prevent the buffer from overflowing and packet getting lost even in such cases, the network system 1 will redirect a packet that would normally be forwarded to such an overloaded route, whose associated buffer fill is above a pre-definable threshold level, to another IFU within the network system through which the next-hop destination can be reached over a non-congested, albeit longer, route. Such an alternative route, when necessary due to a failure or congestion associated with the primary route, is determined based on the FIT 40 of each packet 39 and the fill-level of the data buffers associated with each system— internal L1 connection i.e. route originating from the IFU 4 making the forwarding decision. The destination IFU of such an alternative route in turn re-forwards each such packet arriving to it over the network system 1 whose FIT indicates that the packet is not primarily destined to its adjacent upper-layer 19 node either towards the IFU adjacent to the primary next-hop destination of the packet or to its own adjacent upper-layer node, depending on the FIT of the packet, and on the current traffic load and reachability status of the route from that IFU to the primary next-hop destination. An application of such traffic-load and destination-reachability-based alternative routing is server load balancing, wherein a packet from an ingress-direction interface 3 of the network system 1 is delivered to its primary next-hop destination, i.e. the primary server, indicated by its FIT 40 whenever that primary server is reachable and the route to it is not over-loaded, and otherwise to an alternative server. A detailed system implementation specifications for the both the congestion avoidance and failure rerouting scheme for the preferred embodiment of the invention are disclosed in the referenced patent application [2], in particular in chapter 3.4.6 of its Appendix B.

Route Optimization and Delay Minimization:

The above described capability of the network system 1 to use an alternative route across the network to reach either an alternative next-hop destination, or to reach the primary next-hop destination using an alternative route, which usually involves at least one intermediate IFU 4 i.e. an intermediate packet forwarding point. The primary purpose of such route optimization is to maximize the global throughput of packet traffic across a communications network via routing traffic using network routes that have an adequate amount of bandwidth available to deliver a data packet between its network ingress and egress points. Such route optimization process also reduces the packet loss rate and queuing delay that the data packets experience at packet forwarding points due to the fact that the IFUs 4 of the network system 1 are able to dynamically select the least loaded one of the alternative routes, based on the amount of data queued in the data buffers associated with alternative routes across the network system. I.e., when alternative routing i.e. load-balancing is enabled for a certain packet, as indicated in its FIT, e.g. as per Table B-3-5-2 (see bit 7 of byte 2), the IFU 4 on which it arrives over its ingress-direction point-to-point link 3 will forward such packet along a route whose associated buffer fill is below a pre-definable congestion threshold, whenever possible.

Use of Unutilized Network Fiber Transport Bandwidth as Optical Buffering Capacity:

When the above described real-time traffic-load-adaptive route optimization process involves delivering a packet to its next-hop destination across network system 1 along an alternative route, via an intermediate IFU 4, for the purpose of avoiding a congestion on the normally used direct route and preventing packet loss due to a buffer, the network system 1 can be said to use the network bandwidth among the IFUs as optical buffering capacity, as a more efficient and scalable alternative to using only conventional electrical buffering capacity, such as RAM chips, at the IFUs. In addition to such novel optical buffering method, the network system 1, with its capability to route a packet to its primary next-hop destination via intermediate IFUs using under-utilized routes in case the direct route to the primary next-hop destination is over-loaded, is able to utilize also the available electrical buffering capacity at intermediate IFUs along the alternative route, thus accomplishing a novel well scalable distributed buffering scheme. With such novel optical and distributed buffering methods, a packet forwarding node, such as an IFU, rather than trying to electrically buffer the packets in RAMs until the congestion clears, would forward a packet primarily destined to a congested link, using an alternative non-congested link, to a suitable other IFU in the network domain 1 that, at a later time by when the congestion is likely to be over, can re-forward the packet to the link it is destined to. If the next-hop destination port 3 was still congested when the second IFU would be re-forwarding the packet, that IFU could continue passing the packet to another suitable IFU within the network system 1 for re-forwarding, and so on, until the packet eventually reaches an IFU that has electrical buffering capacity available to schedule the packet for transmission to its next-hop upper-layer 19 destination node.

In addition to overall minimizing the need for electrical buffering capacity, and thereby optimizing the performance as well as the implementational efficiency of packet-switching networks, it is worth to note that these novel route optimization and associated optical and distributed buffering schemes of the present invention enable to achieve an optimal network throughput with using only 'incremental' electrical buffers, i.e. data buffers at IFUs that are just deep enough to monitor the traffic load level on their associated routes, instead of using electrical data buffers that would be large enough to be able to physically store an equal amount of data as a fiber connection between two nodes in a wide area network. Note that a 50 Mbps STS-1 connection (the basic SONET signal data rate) can store approximately $[10^{-3}\text{m}/(2.5\times 10^{-8}\text{m/s})]\times 5\times 10^{7}\text{b/s}=200$ bits per a kilometer of the fiber span between two nodes. For instance, an STS-192 connection on a 100 km fiber can be used to store approximately 3.84 Mb of data. Thus the novel capability of the present invention to dynamically use available network bandwidth on non-congested routes as optical buffering capacity and to utilize the available electrical buffering capacity at the IFUs 4 along the non-congested alternative routes provides enough effective data buffering capacity per each route across the network system 1 among the upper-layer nodes 2 it interconnects so that the IFUs only need such an amount of electrical buffering capacity that enables them to monitor the traffic load level on the routes originating from it. Such amount of incremental electrical buffering capacity can be implemented with high-throughput on-chip RAMs, thus eliminating the need to use larger, low-throughput off-chip RAMs within the network system 1. Currently, on-chip RAMs support an order of ten times higher data throughput rates than off-chip RAMs, which often form bandwidth bottlenecks in conventional packet-switching systems. Therefore, the novel real-time traffic-load-adaptive route optimization capability and the associated network-scope distributed and optical data buffering methods of the present invention, i.e. the network system 1, also enable supporting substantially higher network interface 3 data rates in addition to optimizing network throughput and performance.

System Specifications

The Appendix B, and in particular the data plane discussion in its section 3.5, of the referenced provisional patent application [2] provides detailed system engineering specifications for a practical implementation of the packet forwarding scheme of the present invention. A mapping between acronyms used in the referenced patent application [2] and the more general terms and acronyms used in this specifications is provided below:

ABI IFU, reference character 4

AMB L1 connection between IFUs, a route across a network system 1

AMR Network system 1 configured to provide protected direct full-mesh connectivity among the set 2 of packet-switching nodes it interconnects The system specifications in referenced provisional patent application [2] relate to an application of the currently preferred embodiment in an environment where the network system 1, called AMR or another assembly of AMBs therein, delivers MPLS packets among MPLS Label Edge Routers (LERs) or switches. While the Appendix B of the referenced patent application [2] provides detail specifications for a particular practical implementation of the present invention, the MPLS forwarding related chapters of the specifications are rewritten in the following in a more general form:

MPLS Forwarding:

For MPLS traffic, the network system 1 is completely L2 (and above) protocol transparent; it does not modify the PPP or MPLS headers, except for that the MPLS TTL is decremented by one every time an MPLS packet is re-forwarded at egress-direction external interface 3 network system 1. The IFUs 4 of network system 1 do not re-forward packets with MPLS TTL less than 1, to prevent packets from looping around.

Interconnect of MPLS Routers or Switches using Network System 1:

For the purpose of interconnection of MPLS routers of switches (both called collectively as MPLS switches) over a network system 1, the MPLS switches 2 operate as if they were directly connected to each other over dedicated (non-shared) inter-switch PPP links 6, with a difference that in the case of network system 1-based interconnect, the dedicated inter-switch ports of the MPLS switches are replaced by a single stat-muxed PPP port 3 between each MPLS switch and its adjacent IFU 4 of network system 1. The mesh of dedicated inter-switch PPP links are replaced within the network system 1 with a mesh of adaptive L1 connections between its IFUs 4. Thus, in case of network system 1 interconnecting a group 2 of MPLS switches, each MPLS switch of the group transmits all its packets to any other MPLS switch in the group over single (optionally protected) stat-muxed PPP link 3 between the MPLS switch and its adjacent IFU, instead of transmitting the packets on one (or more) of the destination-MPLS-switch-dedicated ports 90 that would be required in a conventional, dedicated inter-switch PPP link-based network architecture 91.

Ingress Packet Forwarding:

For each MPLS packet 39 that an MPLS switch 2 passes for delivery over the network system 1, the MPLS switch selects the next-hop MPLS switch(es) for the packet by configuring a forwarding instruction 40 (or plain FEV 30), which includes a next-hop destination MPLS switch selection-code, i.e. the FEV-field, in the Label field of the top MPLS LSE of the packet.

Thus, by using a network system 1 for delivering packets 39 among N (an integer) MPLS switches 2, the conventional scheme of having each MPLS switch to exchange packets with the other (N−1) MPLS switches over (N−1) dedicated inter-switch links 90 is replaced by having each MPLS switch transmit all its packets over single stat-muxed link 3 to its adjacent IFU 4 and instructing, by inserting a FIT 40 into the top-most MPLS Label, the IFU 4 to forward each packet to the appropriate next-hop destination MPLS switch(es).

As an example, consider a case where an MPLS switch needs direct L2 connectivity to eight other MPLS switches 2. Using dedicated inter-switch L2 links 90, the MPLS switch would need eight L2 ports 3, one per each of the eight directly reachable MPLS switches. Logically, these ports and the next-hop MPLS switches associated with them can be arranged to appear to their host MPLS switch as if arranged in a row 29 from left to right. Using network system 1 for interconnecting the nine MPLS switches, each one of the nine MPLS switches exchanges packets with all of its eight directly L2-reachable MPLS switches over the same stat-muxed PPP link 3 to its adjacent IFU 4, and specifies (for the IFU) the next-hop destination MPLS switch(es) of each packet by configuring a FIT 40 for the packet. The FIT is configured by setting up bit(s) in the FEV-field 30 of the top MPLS Label of the packet 39, with each set bit corresponding to the location(s) of the next-hop destination MPLS switch(es) in the row 29 as which they appear to the MPLS switch passing the packet to the network system 1.

The sub-fields of the currently preferred FIT format 40 and their semantics is are specified in the below Table 1, which is accordant to the Table B-3-5-2 of the Appendix B of the referenced patent application [2]:

TABLE 1

The semantics and bit encoding of the sub-fields in FITs 40 for use in a network system 1 in an MPLS-switch 2 interconnect application. The 20-bit FIT can be mapped into a single MPLS Label field.

| MPLS Label byte/bits | Field name (see FIG. 4) | Semantics |
|---|---|---|
| Byte 0, (1st byte) bits 7:0 | Destination ID # (DI), sub-field 41 | The unique ID # of the primary next-hop destination MPLS switch (or a multicast group ID #). A pre-definable code, such as value 0 in this field, indicates the packet 39 is an anycast packet. The destination IFU makes packet re-forwarding decisions, in cases of multicast, load-balancing and protection re-routing, based on this field and EADE 43. |
| Byte 1, (2nd byte) bits 7:0 | Forwarding Enable Vector (FEV), subfield 30 | For non-anycast packets: Bit n, (n = 0, 1, . . . , 7) if set, the packet is to be forwarded to the n:th leftmost next-hop MPLS switch in row 29 as seen by the MPLS switch setting the Label. For anycast packets: like above except that the packet is to be forwarded only to that next-hop destination that currently has the least level of data in its associated buffer queued for future delivery across the network system 1 to its next-hop destination. If no bits are set here, the packet is passed to the local software. |
| Byte 2, (3rd byte) bit 7 | Explicit Alternative Destination-Enable (EADE), subfield 43 | If not set, the packet may not be forwarded to a next-hop destination other than the one specified by FEV 30, unless the BDN 44 is set to a pre-definable code, such as a binary value "111", enabling default alternative routing, in which case the packet may be forwarded to the software-configured default alternative next-hop destination (specific to the primary destination indicated by FEV 30) in case its primary next-hop destination is congested. If set, the below BDN 44 field specifies the alternative next-hop destination in case of a congestion or a failure associated with the primary next-hop destination MPLS switch specified by the FEV 30. |
| Byte 2, (3rd byte) bits 6:4 | Backup Destination Number (BDN), subfield 44 | The number (0 . . . 7, the order in row 29 starting from left) of the alternative next-hop destination to which the packet is to be forwarded if the fill-level of the FIFO buffer associated with its primary route (as specified by FEV) is above a configured threshold level or if the FIFO is full, or if software has, e.g. due to a temporary failure, disabled forwarding traffic on to the primary route specified by the FEV-field 30 of the MPLS packet 39. |

Egress Packet Forwarding:

Egress packet forwarding function is equal to the ingress packet forwarding described above; the packets routed across the network domain 1 to a destination IFU 4 within the network system 1 are forwarded, based on their FITs (MPLS Labels), to a (sub)set of the following logical ports: the egress PPP link 3 of the destination IFU, and the L1 links to the remote IFUs of the network system 1 that are L1-reachable from that IFU.

MPLS Forwarding within Clustered Network Systems:

In case the IFU 4 interfaces with another IFU 4 through its PPP link 3, the egress IFU of a network system 1 pops the top MPLS Label, i.e. deletes the first three bytes, of the MPLS packets that it forwards on its egress PPP link. The IFU at the other end of the PPP link will forward its ingress packets using the new top MPLS Label of the packet. This scheme allows the MPLS switches interconnected by a cluster 80 of network systems 1 to specify an intended route of a packet across the clustered network system by configuring a dedicated FIT 40 for each network system 1 stage along the intended route of the packet across such cluster of network systems 1, and inserting the network system 1-specific FITs in the Label fields of the appropriate MPLS LSEs.

CONCLUSIONS

This detailed description is a specific description of the currently preferred embodiment of the present invention for practical applications discussed in the foregoing. Specific architectural and logic implementation examples are provided for the purpose illustrating a currently preferred practical implementation of the invented concept. Thus, this detail description of the invention and the attached drawings are to be regarded as illustrative rather than restrictive description of the present invention.

Naturally, there are multiple alternative ways to implement or utilize, in whole or in part, the principles of the invention as set forth in the foregoing. Therefore, those skilled in the art will be able to develop different versions and various modifications of the described embodiments, which, although not necessarily each explicitly described herein individually, utilize the principles of the present invention, and are thus included within its spirit and scope. For instance, while this detailed description has used consistently MPLS as the assumed packet-switching protocol, mapping the concept of the invented forwarding method for various other packet-oriented protocols, such as ATM, FR, Ethernet/MAC/VLAN, IP, and PPP, will be obvious for those skilled in the art, as the forwarding identifier tag (FIT) format used in the present invention can be mapped basically into any applicable packet protocol header fields.

As it thus is obvious that various changes, substitutions, and modifications can be made in to the above described currently preferred embodiments, such modified versions of the described embodiments will be encompassed within the spirit and scope of the present invention, even if all of the features identified above are not present. For example, the system may be differently partitioned into sub-systems, modules and functions. Moreover, the modules, processes, process steps, methods and information fields described and illustrated in the drawings and in the description of the preferred embodiment as discrete or separate may be divided in to sub-modules etc, and/or combined or integrated with other modules, processes, process steps, methods and information fields without departing from the spirit and scope of the present invention, which is defined by the claims following.

What is claimed is:

1. A packet forwarding method for delivering data packets across a communications network,
   wherein the network comprises a set of ingress and egress ports, and provides routes for delivering packets among a set of nodes that interface with the network through the ingress and egress ports, with a set of nodes reachable to each other via the routes across the network referred to as a set of next-hop destinations to each other,
   and wherein the network determines whether to deliver a packet arrived on an ingress port to a particular egress port based at least in part on a forwarding identifier included in the packet and on network status,
   wherein the network status includes: i) current reachability of one or more of the set of next-hop destinations; and ii) current traffic load level on a route or routes across the network to one or more of the set of next-hop destinations, wherein the traffic load level on a route towards a next-hop destination is determined based at least in part on an amount of data currently queued in a data buffer for a future delivery on the route across the network to the next-hop destination associated with the buffer.

2. The packet forwarding method of claim 1, wherein the forwarding identifier includes an indication of to which one or ones of the set of next-hop destinations the packet is intended to be delivered.

3. The packet forwarding method of claim 1, wherein the forwarding identifier includes an individualized indication per at least one next-hop destination of whether the packet is intended to be delivered to that node.

4. The packet forwarding method of claim 1, wherein the forwarding identifier includes an indication of whether the packet is intended to be delivered to a particular next-hop destination individually per each one of the set of next-hop destinations normally reachable through the network from the ingress port on which the packet arrived the network.

5. The packet forwarding method of claim 1, wherein, when a next-hop destination indicated by the forwarding identifier of a packet is not directly reachable from the ingress port on which the packet arrives, the network provides means for routing the packet to the said next-hop destination through one or more intermediate packet forwarding points.

6. The packet forwarding method of claim 1, wherein, when the current amount of data queued in the buffer for a future delivery to its associated next-hop destination is above a pre-definable threshold, the network is able to route the packet to the said next-hop destination through one or more intermediate forwarding points.

7. The packet forwarding method of claim 1, wherein in case the forwarding identifier of a packet indicates that the packet should be forwarded to one of a specified set of two or more alternative next-hop destinations, the network delivers the packet to such currently reachable one of the said set of alternative destinations whose associated current level of traffic load is below a pre-definable threshold, or is the lowest among the said set of alternative destinations.

8. The packet forwarding method of claim 1, wherein the forwarding identifier identifies a set of two or more alternative next-hop destinations out of which the packet is intended to be delivered to a currently suitable one.

9. The packet forwarding method of claim 8, wherein the next-hop destination to which the network delivers the packet is chosen out of the set of alternative next-hop destinations based at least in part on the current levels of traffic load on the routes across the network toward the said set of alternative next-hop destinations.

10. The packet forwarding method of claim 8, wherein the set of alternative next-hop destinations have selection priorities associated with them, and wherein such one of the currently reachable alternative next-hop destinations is selected that has the highest selection priority out of those of the alternative next-hop destinations whose current level of traffic load is below a pre-definable threshold.

11. A process for maximizing throughput of packet traffic across a network, the network comprising a set of interfaces for exchanging data packets between a set of upper-layer nodes interconnected by the network, and a capability to provide a set of alternative routes to deliver a packet arrived into the network to a proper upper-layer next-hop destination node indicated by a forwarding identifier of the packet, the process comprising a set of process steps including:

receiving, by the network, sequences of data packets from the upper-layer nodes it interconnects via their associated interfaces;

monitoring, by a network interface on which a packet arrived, a status of the set of individual alternative routes to deliver the packet, wherein the monitored status of a route includes a traffic load level on the route and reachability of the next-hop destination of the route;

selecting, by the network interface on which the packet arrived, depending on the monitored status of the individual alternative routes, a suitable route of the set of alternative routes to deliver the packet; and delivering the packet along the selected route across the network to its next-hop destination node, wherein the traffic load level on a route is determined based at least in part on an amount of data queued in a buffer for future delivery on the route.

12. The process of claim 11, wherein the reachability of the next-hop destination of the route is checked periodically.

13. The process of claim 11, wherein the step of selecting a route is done as follows:

out of the routes whose next-hop destination node is reachable, the one having the lowest level of data queued for future delivery is selected.

14. The process of claim 11, wherein the alternative routes have pre-definable selection priorities associated with them, and wherein the step of selecting a route is done as follows:

out of the routes whose next-hop destination node is reachable and whose associated amount of data queued for future delivery is below a pre-definable threshold, the one having the highest selection priority is selected.

15. The process of claim 11, wherein at least one of the alternative routes involves one or more intermediate packet forwarding points.

16. The process of claim 15, wherein an intermediate packet forwarding point along an alternative route is able to forward a data packet arriving to it on the alternative route either i) toward the primary next-hop destination, or ii) to an alternative next-hop destination of the packet, each of which next-hop destinations being indicated, explicitly or implicitly, by a forwarding instruction within the packet.

17. The process of claim 16, wherein the intermediate packet forwarding point forwards the packet toward its primary next-hop destination in case the primary next-hop destination is reachable from it when it makes its forwarding decision for the packet.

18. A network system for delivering data packets among a set of upper-layer nodes, the network system providing:

a set of external interfaces for passing packets between the upper-layer nodes and the network system;

a set of routes for delivering packets across the network system between the external interfaces; and a capability to deliver a packet arrived on an external interface to the other external interfaces for transmitting the packet to their associated upper-layer nodes, with such set of upper-layer nodes referred to as a set of next-hop destinations to the upper-layer node where the packet arrived from, wherein the network system determines to which individual one or ones of the set of next-hop destinations it delivers a packet based at least in part on a set of one or more forwarding instructions carried within the packet, and on a route status information of the routes leading to the set of next-hop destinations, and wherein the route status information includes i) reachability of its next-hop destination, and ii) traffic load level on the route, wherein the traffic load level on a route is determined based at least in part on an amount of data queued on a buffer for a future transmission on the route.

19. The network system of claim 18, further providing a capability deliver data packets among the set of upper-layer nodes without any modification of the packets.

20. The network system of claim 18, further providing a capability deliver data packets among the set of upper-layer nodes without modifying any information fields of the packets, except for a time-to-live decrement.

21. The network system of claim 18, further providing a capability deliver data packets among the upper-layer nodes without modifying, including adding or deleting, any upper-layer protocol information fields of the packets.

22. The network system of claim 18, wherein the individual next-hop destination or destinations to which the network system forwards a packet is determined by the network system without using a forwarding, switching or routing table, or other forwarding, switching or routing information database.

23. The network system of claim 18, wherein the reachability of the next-hop destinations of the routes across the network is automatically checked on a periodic basis.

24. The network system of claim 18, wherein the set of forwarding instructions of a packet includes an indication of two or more alternative next-hop destinations, and wherein the network system forwards the packet out of the reachable alternative next-hop destinations to the one that has the lowest traffic load level on its associated route.

25. The network system of claim 18, wherein the set of forwarding instructions of a packet includes an indication of a primary next-hop destination and an indication of an alternative next-hop destination, and wherein, when both the primary and the alternative next-hop destinations are reachable, the network system forwards the packet to the primary next-hop destination if i) the amount of data queued in the buffer associated with the primary next-hop destination is below a pre-definable threshold, or ii) the amount of data queued in the buffer associated with the alternative next-hop destination is above a pre-definable threshold;

otherwise, the network system forwards the packet to the alternative next-hop destination.

26. The network system of claim 18, wherein the set of forwarding instructions of a packet includes an indication of a primary next-hop destination and an indication of an alternative next-hop destination, and wherein, when the primary next-hop destination is reachable or when the alternative next-hop destination is not reachable, the network system forwards the packet to the primary next-hop destination, and otherwise to the alternative next-hop destination.

27. The network system of claim 18, wherein a packet is delivered to a reachable next-hop destination based at least in part on whether forwarding the packet to the said next-hop destination is explicitly enabled by the set of forwarding instructions of the said packet.

28. The network system of claim 18, wherein the set of forwarding instructions of a packet includes an explicit forwarding enable indicator per one or more of the set of next-hop destinations, and wherein the network system delivers the packet to each such reachable next-hop destination to which forwarding of the packet was enabled by the explicit forwarding enable indicator associated with that particular next-hop destination.

29. The network system of claim 28, wherein the set of forwarding instructions of a packet includes an explicit forwarding enable indicator per each one of the set of next-hop destinations.

30. The network system of claim 18, further providing a capability to deliver a packet to a next-hop destination indicated by the set of forwarding instructions of the packet via at least two alternative routes across the network system.

31. The network system of claim 30, wherein the network system selects the alternative route along which to forward the packet to its indicated next-hop destination based at least in part on the reachability of that next-hop destination via the individual alternative routes.

32. The network system of claim 30, wherein the network system selects the alternative route along which to forward the packet to its indicated next-hop destination based at least in part on the traffic load level on the individual alternative routes.

33. The network system of claim 30, wherein one or more of the alternative routes includes at least one intermediate packet forwarding point.

34. The network system of claim 33, wherein an intermediate packet forwarding point along an alternative route provides a capability to re-forward the packet to an appropriate next-hop destination, which it determines based at least in part on the forwarding instructions of the packet and on the external interface from where it received the packet.

35. A cluster of network systems of claim 18 containing at least two member network systems, wherein the member network systems further provide interfaces for passing packets between the member network systems of the cluster.

36. The network system cluster of claim 35, wherein the set of forwarding instructions of a packet includes a dedicated forwarding instruction for at least one of the member network systems along an intended route of the packet across the cluster of network systems.

37. The network system cluster of claim 35, wherein the set of forwarding identifiers of a packets include a dedicated forwarding instruction per each member network system along an intended route of the packet across the cluster of network systems.

* * * * *